(12) United States Patent
Yan et al.

(10) Patent No.: US 11,512,271 B2
(45) Date of Patent: Nov. 29, 2022

(54) FRUIT WINE AROMA ENHANCEMENT BREWING TECHNOLOGY USING CUTINASE

(71) Applicant: Hebei Normal University of Science and Technology, Qinhuangdao (CN)

(72) Inventors: Hejing Yan, Qinhuangdao (CN); Jun Li, Qinhuangdao (CN); Chang Liu, Qinhuangdao (CN); Fengmei Zhu, Qinhuangdao (CN); Man He, Qinhuangdao (CN)

(73) Assignee: Hebei Normal University of Science and Technology, Qinhuangdao (CN)

( * ) Notice: Subject to any disclaimer, the term of this patent is extended or adjusted under 35 U.S.C. 154(b) by 184 days.

(21) Appl. No.: 16/914,958

(22) Filed: Jun. 29, 2020

(65) Prior Publication Data

US 2021/0115364 A1    Apr. 22, 2021

(30) Foreign Application Priority Data

Oct. 18, 2019   (CN) .......................... 201910993885.2

(51) Int. Cl.
*C12G 1/022*     (2006.01)
*C12G 3/026*     (2019.01)
(Continued)

(52) U.S. Cl.
CPC ......... *C12G 1/0203* (2013.01); *C12G 1/0213* (2013.01); *C12G 1/04* (2013.01);
(Continued)

(58) Field of Classification Search
CPC .... C12G 1/0203; C12G 3/024; C12G 1/0213; C12G 1/04; C12G 1/06; C12G 2200/06; C12H 1/061; C12H 1/063
See application file for complete search history.

(56) References Cited

U.S. PATENT DOCUMENTS

2004/0063184 A1*  4/2004  Grichko .................... C12P 7/06
                                                                 435/161

FOREIGN PATENT DOCUMENTS

CN         107365655       * 11/2017  ............. C12Q 3/024

OTHER PUBLICATIONS

CN107365655, English Translation Google, Nov. 2017, Hebei.*
Low et al, Produciton of Apple Cider from apple pomace using an enzymatic pre-treatment process, BREE 495 Engineering Design 3, Apr. 2017 (LOW).*

(Continued)

*Primary Examiner* — Donald R Spamer
*Assistant Examiner* — Philip A Dubois
(74) *Attorney, Agent, or Firm* — IPro, PLLC (57) ABSTRACT

A fruit wine aroma enhancement brewing technology using cutinase belongs to the technical field of fruit wine brewing. According to the present disclosure, in order to solve the problem that fruit wine prepared through an existing fruit wine fermentation technology is poor in quality such as aroma and taste, Muscat grapes or apples are adopted as raw materials, and after crushing, separating peel residue, performing peel residue heat treatment and enzyme treatment, mixing the treated peel residue and clear juice, adding auxiliary materials (potassium metabisulfite, pectinase and β-glucosidase), adjusting a sugar degree, inoculating a high-glycerol-field yeast and fermenting with temperature controlled, inoculating an active dry yeast and fermenting with the temperature controlled until fermentation is finished, separating and removing the peel residue, fining, filtering to remove residue, performing stabilizing treatment and performing filtration sterilization, dry grape wine or cider is obtained. The present disclosure can be used in large-scale production of dry fruit wine.

8 Claims, 1 Drawing Sheet

(51) Int. Cl.
　　　*C12G 3/024*　　　(2019.01)
　　　*C12G 1/028*　　　(2006.01)
　　　*C12G 1/04*　　　(2006.01)
　　　*C12G 1/06*　　　(2019.01)
　　　*C12H 1/044*　　　(2006.01)
　　　*C12H 1/065*　　　(2006.01)
　　　*C12H 1/07*　　　(2006.01)

(52) U.S. Cl.
　　　CPC ............... *C12G 1/06* (2013.01); *C12G 3/024* (2019.02); *C12G 3/026* (2019.02); *C12H 1/0408* (2013.01); *C12H 1/061* (2013.01); *C12H 1/063* (2013.01); *C12G 2200/05* (2013.01); *C12G 2200/15* (2013.01)

(56) References Cited

OTHER PUBLICATIONS

Jolly et al., Effect of *Saccharomyces*, Non-*Saccharomyces* Yeasts and Malolactic Fermentation Strategies on Fermentation Kinetics and Flavor of Shiraz Wines, Fermentation 2017, 3, 64; doi:10.3390/fermentation3040064 (JOLLY).*

Angel Active Dry Wine Yeast Rv002 for Red Wines Grape Juice Fermentation—Buy Pineapple Wine Yeast,Wine Juice Yeast, Winery Yeast Product on Alibaba.com (ANGEL), accessed at https://www.alibaba.com/product-detail/Angel-Active-Dry-Wine-Yeast-RV002_624149991007.html (1999).*

Xu et al, Dispersive Liquid-Liquid Microextraction Method for HPLC Determination of Phenolic Compounds in Wine, Food Anal. Methods (2017) 10:2383-2397.*

\* cited by examiner

FRUIT WINE AROMA ENHANCEMENT BREWING TECHNOLOGY USING CUTINASE

TECHNICAL FIELD

The present disclosure belongs to the technical field of fruit wine brewing, and particularly relates to a fruit wine aroma enhancement brewing technology using cutinase.

BACKGROUND

Aroma substances, such as terpene substances, forming typical flavor of fruit wine (especially grape wine, cider and the like) mainly come from berries themselves. Most of these substances exist in the form of odorless glycosides (aroma glycosides). A yeast can secrete some glycosidases to hydrolyze the aroma glycosides, so that free-state aroma substances capable of generating the flavor are generated. Different yeasts have the glycosidases different in type and activity, and the glycosidases have different hydrolysis effects on the aroma glycosides, so that the released aroma substances are different in type and content ratio. In current fruit wine brewing, an active dry yeast is used as a leavening agent, but the activity of a glycosidase of the active dry yeast is often low, and the active dry yeast is mostly imported, and is limited in variety. That is why fruit wine in China, especially grape wine and cider, is seriously homogenized, is boring and odorless in aroma, and lacks variety characteristics. According to an existing brewing process, aroma enhancement is achieved mainly by adding exogenous β-glucosidase or active non-*Saccharomyces cerevisiae* with high yield of β-glucosidase, a certain aroma enhancement effect is achieved, but the aroma enhancement effect is limited.

Cutin is an important component of a surface layer of a plant aerial part, and in some fruits, the thickness of a cuticle is 1-40 μm. The cuticle is mainly composed of the cutin, and in addition, the cuticle also contains about 0.6% of wax, 0.9% of pectin, 1.3% of protein, 2.0% of non-fiber polysaccharide, dust, impurities and other components. Cuticles, pectin substances and epidermal cell walls are mutually mixed and bonded to form epidermal layers of stems, leaves, flowers, fruits and the like of plants. Cutinase is a kind of hydrolase capable of degrading the cutin and generating a large number of fatty acid monomers, belongs to serine esterase, can catalytically hydrolyze ester bonds of insoluble polymer cutin, and can also act on other long-chain and short-chain fatty acid esters, emulsified triglyceride and the like. The cutinase has wide application potentials in industrial production. However, no cutinase is reported to be used for aroma enhancement of grape wine and other fruit wines so far.

SUMMARY

In order to solve the problem that fruit wine prepared through an existing fruit wine fermentation technology is poor in quality such as aroma and taste, the present disclosure provides a fruit wine aroma enhancement brewing technology using cutinase, including the following steps:

1) treating raw materials: crushing grapes or apples to obtain clear juice and peel residue, and adding potassium metabisulfite in a crushing process, wherein an adding amount of the potassium metabisulfite is 50-70 mg/L according to a volume of mixed juice of the clear juice and the peel residue; and further adding vitamin C and carbon dioxide in the crushing process when the raw materials are the apples, wherein an adding amount of the vitamin C is 20-40 mg/L according to the volume of the mixed juice;

2) performing heat treatment on the peel residue: keeping the peel residue at a temperature of 72-75° C. for 1 h;

3) performing enzyme treatment on the peel residue: mixing 20% of the clear juice obtained in step 1) and the peel residue subjected to heat treatment in step 2) to obtain mixed residue liquid, adding 20-50 mg/L of a complex enzyme I to the mixed residue liquid according to a volume of the mixed residue liquid, and performing enzymolysis at 45-55° C. for 2 h, wherein the complex enzyme I is composed of cellulase, pectinase, xylanase and the cutinase according to a mass ratio of (2-4):(2-4):(1-2):(1-2);

4) preparing mixed juice: mixing the peel residue subjected to the enzyme treatment in step 3) and the clear juice obtained in step 1) to obtain the mixed juice, and adding 20-50 mg/L of a complex enzyme II according to a volume of the mixed juice, wherein the complex enzyme II is composed of the pectinase and β-glucosidase, and a mass ratio of the pectinase to the β-glucosidase is (2-3):(1-2);

5) adjusting a sugar degree: measuring the sugar degree of the mixed juice subjected to the enzymolysis in step 4), and adding sugar to adjust the sugar degree of the mixed juice according to a standard of brewing 12° apple dry wine;

6) performing early-stage fermentation: then, inoculating non-*Saccharomyces cerevisiae* for fermentation, wherein an inoculation ratio of the non-*Saccharomyces cerevisiae* is $10^6$ CFU/mL, a fermentation temperature is 12° C.-15° C., and fermentation time is 6-8 d;

7) performing main fermentation: inoculating a dry yeast seed solution into a fermentation system after the early-stage fermentation is finished, wherein a seed inoculation amount is 10% (mass fraction) of the amount of the non-*Saccharomyces cerevisiae* in the fermentation system at the moment, the fermentation is performed at a temperature of 25-30° C., and the fermentation is stopped when a specific gravity is reduced to 0.994-0.992, so as to obtain fermentation liquor;

8) separating wine and residue: centrifuging the fermentation liquor to obtain a supernate, namely raw wine;

9) performing fining treatment: mixing the raw wine, 0.3-0.5 g/L of bentonite, 0.04-0.06 g/L of egg white powder and the 18-20 mg/L of potassium metabisulfite according to a volume of the raw wine, and performing fining for 8-10 d;

10) performing stabilizing treatment: removing sediments after the fining treatment to obtain wine, and keeping the wine at a temperature of −4-−4.5° C. for 10-14 d;

11) performing filtering: filtering the wine to obtain a fruit wine finished product.

For further definition, in step 1), according to the volume of the mixed juice, the adding amount of the vitamin C is 20 mg/L, and a filling amount of the carbon dioxide is 0.5 kg/kL.

For further definition, in step 3), according to the volume of the mixed residue liquid, the adding amount of the complex enzyme I is 50 mg/L, and the complex enzyme I is composed of the cellulase, the pectinase, the xylanase and the cutinase according to the mass ratio of 2:2:1:1.

For further definition, in step 4), according to the volume of the mixed juice, 40 mg/L of the complex enzyme II is added, the complex enzyme II is composed of the pectinase and the β-glucosidase, and the mass ratio of the pectinase to the β-glucosidase is 2:1.

For further definition, in step 5), the sugar degree of the mixed juice is 23%, wherein a mass ratio of cane sugar to fructose is 2:1.

For further definition, in step 6), the non-*Saccharomyces cerevisiae* is *T. delbrueckii, L. theromotolerans* or *C. zemplinina*.

For further definition, in step 7), a dry yeast is an Angel grape wine active dry yeast RV002.

For further definition, in step 8), after the wine and the residue are separated, according to product types, raw wine of dry red grape wine is subjected to malo-lactic fermentation, specifically, according to the volume of the raw wine, $10^6$ CFU/mL of lactic acid bacteria are inoculated into the raw wine, the fermentation is performed at a temperature of 28-30° C., and the fermentation is finished until no malic acid is detected.

Beneficial Effects

According to the present disclosure, peel residue is subjected to heat treatment at a temperature higher than 72° C., so that dissolution of wax of peel epidermal parts is facilitated, peel cutin, pectin and cellulose are more exposed, accessibility of corresponding hydrolases to substrates is improved, and hydrolysis efficiency of epidermal components is improved; and the cutinase performs hydrolysis on peel cuticles, so that the hydrolysis of pectinase, cellulase and xylanase on peel components is further improved, destruction and disintegration of peel structures are accelerated, the problem of difficulty in extracting the peel components in fruit wine brewing is solved, and dissolution rates of the peel components such as aroma glycosides, pigments and tannin are effectively improved.

Peel residue heat treatment and enzyme treatment are combined with further dipping fermentation, so that leaching rates of the tannin, the pigments and other components in peels are obviously increased, and a wine heavy feeling and a wine aftertaste feeling are greatly enhanced; high-glycerol-yield non-*Saccharomyces cerevisiae* and the active dry yeast (*Saccharomyces cerevisiae*) are configured to sequentially perform mixed fermentation (namely main fermentation) to generate a large amount of glycerol and complex flavor substances, so that aroma complexity and mellow taste of fruit wine are enhanced; early-stage fermentation of the non-*Saccharomyces cerevisiae* reduces a yield of acetic acid in a main fermentation process of the *Saccharomyces cerevisiae*, and reduces acidity of the fruit wine; β-glucosidase is added in a dipping fermentation period and acts on the aroma glucosides released from the peels, and variety and content of free-state aroma substances in fresh wine are obviously increased, so that variety aroma of the fruit wine is increased, and variety characteristics of the fruit wine are highlighted; and in addition, the early-stage fermentation of the non-*Saccharomyces cerevisiae* is performed at a low temperature, so that aromatic components of fruits and flavor of the fruit wine are protected. In wine and residue separation operation, a centrifugal precipitation mode replaces a membrane filtration mode, so that excessive contact between wine liquid and oxygen is prevented, stability of wine is ensured in post-treatment, then fullness of the fruit wine is improved, and the flavor substances are reserved to the maximum extent.

DETAILED DESCRIPTION

According to a fruit wine aroma enhancement brewing method of the present disclosure, Muscat grapes or apples are adopted as raw materials, and through crushing, separating peel residue, performing peel residue heat treatment and enzyme treatment, mixing the treated peel residue and clear juice, adding auxiliary materials (potassium metabisulfite, pectinase and β-glucosidase), adjusting a sugar degree, inoculating high-glycerol-field yeast and fermenting for 7 d with temperature controlled, inoculating an active dry yeast and fermenting with temperature controlled until fermentation is finished, separating and removing the peel residue, fining, filtering to remove residue, performing stabilizing treatment and performing filtration sterilization, dry grape wine or cider is obtained.

By means of hydrolysis and destruction effects of cutinase on peel cuticle cutin, catalytic efficiency of brewing enzyme on peel components such as cellulose and pectin substances is promoted, so that a purpose of accelerating disintegration of peel epidermal layer structures is achieved, release of aroma glycoside substances in peels is facilitated, content of aroma glycosides in fruit juice or fresh wine in a brewing process of fruit wine is increased, content of free-state aroma substances in the fruit wine is increased by combining a hydrolysis effect of the β-glucosidase, and then a purpose of aroma enhancement of the fruit wine is achieved.

In conclusion, innovative points of the present disclosure are summarized as follows:

1. A temperature control range adopted in peel residue heat treatment is 72-75° C., wax of peel parts can be dissolved, wax layers of the peel epidermal structures are enabled to become thinner and less, and enzyme acts on other peel components such as the cutin, the pectin and the cellulose favorably.

2. The heat-treated peel residue is added with the certain amount of clear juice to be mixed, cooling is achieved, energy is saved, meanwhile, the dissolved wax is diluted, and the dissolved wax after the cooling is prevented from being attached to peel surfaces again; the second point is use of the cutinase, the cutinase may hydrolyze the cutin of peel epidermal layers, further enables the components of the cellulose, the pectin and hemicellulose in the peels to be exposed, accelerates the hydrolysis effect of the enzyme on the components, further destroys the peel structures, accelerates disintegration of epidermal layers, and significantly improves dissolution of substances such as the tannin, the pigments and the aroma glycosides in the peels.

3. After the peel residue and the clear juice are mixed, the β-glucosidase is added, so that the β-glucosidase acts on the aroma glycosides favorably, the free-state aroma substances are released, the destruction effect of alcohol generated after main fermentation is started on the β-glucosidase is avoided, and aroma enhancement efficiency of the enzyme is improved.

The raw materials as well as reagents and instruments required in the present disclosure are as follows:

Fruits (Muscat grapes, apples, etc.), the β-glucosidase, cellulase, the pectinase, the xylanase, the cutinase, high-glycerol-yield non-*Saccharomyces cerevisiae* (*T. delbrueckii, L. theromotolerans* or *C. zemplinina*), the potassium metabisulfite, the active dry yeast (Angel grape wine active dry yeast RV002), the cane sugar, a plurality of triangular flasks, a thermometer, a gravitometer, an alcohol meter, gauze, an acid-base burette, a transfer pipette, an inspiratory ball, an electronic analytical balance, an atmosphere presser, a plate and frame filter, a centrifuge and the like. If not otherwise specified, the raw materials as well as the reagents and the instruments can be purchased through commercialized ways.

The technical solutions of the present disclosure are described in detail below.

Comparative Example 1. Brewing of Cider

In a cider brewing technology in the comparative example, without being subjected to peel residue heat treatment, apple peel residue is directly subjected to enzyme treatment, in an enzyme treatment system, cutinase is not used, and a specific method is as follows:

(1) Ripe Rails apples, Granny Smith apples and Gala apples stored for a certain period of time are selected and cleaned, surface moisture is blow-dried by cold air, the three kinds of apples are crushed separately by bar type pressers, and after being crushed, the three kinds of apples are mixed and pressed according to a mass ratio of the Rails apples to the Granny Smith apples to the Gala apples=70%:15%:15% to obtain apple clear juice and the peel residue; and according to a volume of mixed juice of the apple clear juice and the peel residue, 50 mg/L of potassium metabisulfite and 20 mg/L of VC are added in a crushing process, and meanwhile, carbon dioxide gas fills for protection according to a filling amount of 0.5 kg per kilolitre of the mixed juice.

(2) Performing enzyme treatment on the peel residue: a certain amount of the clear juice (with the adding amount being 20% of the clear juice obtained in step (1)) is added into the peel residue obtained through separation for mixing, 50 mg/L of a complex enzyme is added, the complex enzyme is composed of the active cellulase, the active pectinase and the active xylanase according to a mass ratio of 2:2:1, and temperature control treatment (namely enzymolysis) is performed at 50° C. for 2 h.

(3) Mixing peel residue and the original clear juice (mixed juice is prepared): the peel residue subjected to the enzyme treatment in step (2) and the clear juice obtained through pressing in step (1) are mixed to obtain the mixed juice, according to a volume of the mixed juice, 40 mg/L of a complex enzyme II composed of the pectinase for brewing and the β-glucosidase is added, and the complex enzyme II is composed of the pectinase and the β-glucosidase according to a mass ratio of 2:1.

(4) Adjusting a sugar degree: the sugar degree of the apple mixed juice is measured, wherein a ratio of cane sugar to fructose is 2:1, and sugar is added to adjust the sugar degree of the mixed juice to be 23% to reach a standard of brewing 12° dry wine.

(5) Performing early-stage fermentation: the *C. zemplinina* producing glycerol is taken for activation, moderate non-*Saccharomyces cerevisiae* seeds are prepared, the non-*Saccharomyces cerevisiae* seeds are inoculated according to 1×10⁶ CFU/mL per litre, dipping fermentation is performed for 7 d, a cooling device is adopted in a fermentation period to keep a fermentation liquor temperature at 15° C., and cap pressing, temperature measuring, specific gravity measuring and recording are performed every day.

(6) Performing main fermentation: a prepared active dry yeast seed solution is inoculated into a fermentation system after the early-stage fermentation is finished, and a seed inoculation amount is 10% of the amount of non-*Saccharomyces cerevisiae* in the fermentation system at the moment. Management of a fermentation process is performed, a temperature is controlled to be 28° C., the cap pressing, the temperature measuring and the specific gravity measuring are performed every day, and fermentation is stopped when a specific gravity is reduced to 0.992.

(7) Separating wine and residue: centrifugal separation of the peel residue is performed repeatedly (5000 rpm) until separated raw wine is free of large suspended solids, and centrifugation may be stopped to obtain the raw wine.

(8) Starting malo-lactic fermentation (during production, whether the malo-lactic fermentation is performed or not may be determined according to product requirements, for example, when dry red grape wine is brewed, the malo-lactic fermentation is needed to reduce acidity, but white grape wine or the cider requires certain acidity, the malo-lactic fermentation may not be performed): active dry lactic acid bacteria is activated and added to the raw wine according to 1×10⁶ CFU/mL, a temperature is controlled to be 28-30° C. for the fermentation, the temperature measuring is performed every day, timing sampling is performed for malic acid filter paper chromatography, and the fermentation is stopped until no malic acid is detected through the chromatography.

(9) Performing fining treatment: according to a volume of the raw wine, 0.5 g/L of bentonite and 0.05 g/L of egg white powder are fully mixed with wine. In the meanwhile, 20 g/t of the potassium metabisulfite and the VC are separately added to inhibit bacterial contamination and prevent browning, sediments are formed 10 d after the fining treatment is performed, and the sediments are removed.

(10) Performing stabilizing treatment: fermentation cylinders are cooled after the fining treatment is performed and the sediments are removed, a temperature of the wine in the cylinders is kept to be −4.5° C., and the temperature is maintained for 14 d.

(11) Performing filtering: the wine is filtered through cross flow filtration, and sedimentary substances and microorganisms are removed.

It is found that the wine after fermentation through the comparative example has appropriate aroma and acidity in production.

Comparative Example 2. Brewing of Cider

In a cider brewing technology in this comparative example, without being subjected to the peel residue heat treatment, apple peel residue is directly subjected to the enzyme treatment, in an enzyme treatment system, the cutinase is used, and a specific method is as follows:

(1) Ripe Rails apples, Granny Smith apples and Gala apples stored for a certain time are selected and cleaned, surface moisture is dried by cold air, the three kinds of apples are crushed separately by bar type pressers, and after being crushed, the three kinds of apples are mixed and pressed according to a mass ratio of the Rails apples to the Granny Smith apples to the Gala apples=70%:15%:15% to obtain apple clear juice and the peel residue; and according to a volume of mixed juice of the apple clear juice and the peel residue, 50 mg/L of potassium metabisulfite and 20 mg/L of VC are added in a crushing process, and meanwhile, carbon dioxide gas fills for protection according to a filling amount of 0.5 kg per kilolitre of the mixed juice.

(2) Performing enzyme treatment on the peel residue: a certain amount of the clear juice (with the adding amount being 20% of the clear juice obtained in step (1)) is added into the peel residue obtained through separation for mixing, 50 mg/L of a complex enzyme I is added, the complex enzyme I is composed of the active cellulase, the active pectinase, the active xylanase and the active cutinase according to a mass ratio of 2:2:1:1, and temperature control treatment (namely enzymolysis) is performed at 50° C. for 2 h.

(3) Mixing peel residue and the original clear juice (mixed juice is prepared): the peel residue subjected to the enzyme treatment in step (2) and the clear juice obtained through pressing are mixed to obtain the mixed juice, according to a volume of the mixed juice, 40 mg/L of a complex enzyme II composed of the pectinase for brewing and the β-glucosidase is added, and the complex enzyme II is composed of the pectinase and the β-glucosidase according to a mass ratio of 2:1.

(4) Adjusting a sugar degree: the sugar degree of the apple mixed juice is measured, wherein a ratio of cane sugar to fructose is 2:1, and sugar is added to adjust the sugar degree of the mixed juice to be 23% to reach a standard of brewing 12° dry wine.

The other steps are the same as those of Comparative Example 1.

In production, it is found that in the comparative example, the cutinase is configured to perform the enzyme treatment on the peel residue, part of cuticles is degraded, degrees of hydrolysis of the cellulase, the pectinase and the xylanase on the corresponding components in the apple epidermis are improved, dissolution rates and the hydrolysis of the tannin and flavor precursor substances are improved, and the content of the free-state aroma components in the cider is increased by combining the effect of the β-glucosidase, so that fruity aroma of the cider is enhanced. Increase of content of the tannin in wine enhances wine heavy feeling and aftertaste feeling.

Comparative Example 3 Brewing of Cider

In a cider brewing technology in the comparative example, apple peel residue is subjected to the peel residue heat treatment and then is subjected to the enzyme treatment, but the cutinase is not used, and a specific method is as follows:

(1) Ripe Rails apples, Granny Smith apples and Gala apples stored for a certain time are selected and cleaned, surface moisture is dried by cold air, the three kinds of apples are crushed separately by bar type pressers, and after being crushed, the three kinds of apples are mixed and pressed according to a mass ratio of the Rails apples to the Granny Smith apples to the Gala apples=70%:15%:15% to obtain apple clear juice and the peel residue; and according to a volume of mixed juice of the apple clear juice and the peel residue, 50 mg/L of potassium metabisulfite and 20 mg/L of VC are added in a crushing process, and meanwhile, carbon dioxide gas fills for protection according to a filling amount of 0.5 kg per kilolitre of the mixed juice.

(2) Performing peel residue heat treatment: the peel residue is subjected to the heat treatment for 1 h through controlling a temperature to be 75° C.

(3) Performing enzyme treatment on the peel residue: a certain amount of the clear juice (with the adding amount being 20% of the clear juice obtained in step (1)) is immediately added into the peel residue after the heat treatment for uniform mixing and cooling, 50 mg/L of an active complex enzyme is added, the complex enzyme is composed of the cellulase, the pectinase and the xylanase according to a mass ratio of 2:2:1, and temperature control treatment (namely enzymolysis) is performed at 50° C. for 2 h.

(4) Mixing peel residue and the original clear juice (mixed juice is prepared): the peel residue subjected to the enzyme treatment in step (3) and the clear juice obtained through pressing are mixed to obtain the mixed juice, according to a volume of the mixed juice, 40 mg/L of a complex enzyme II composed of the pectinase for brewing and the β-glucosidase is added, and the complex enzyme II is composed of the pectinase and the β-glucosidase according to a mass ratio of 2:1.

(5) Adjusting a sugar degree: the sugar degree of the apple mixed juice is measured, wherein a ratio of cane sugar to fructose is 2:1, and sugar is added to adjust the sugar degree of the mixed juice to be 23% to reach a standard of brewing 12° dry wine.

The other steps are the same as those of Comparative Example 1.

In production, it is found that in the comparative example, the peel residue is subjected to the heat treatment, part of the wax is dissolved, and efficiency of hydrolysis of the cellulase, the pectinase and the xylanase on the peel components is improved, so that a dissolution rate and the hydrolysis of flavor precursor substances in peels are improved, the content of the free-state aroma components in the cider is increased by combining the effect of the β-glucosidase, and then fruity aroma of the cider is enhanced. Increase of content of the tannin in wine enhances wine heavy feeling and aftertaste feeling.

Example 1. Brewing of Cider

In a cider brewing technology in the example, apple peel residue generated after crushing is subjected to the heat treatment and then is subjected to the enzyme treatment, the cutinase is used in a enzyme treatment process, and a specific method is as follows:

(1) Ripe Rails apples, Granny Smith apples and Gala apples stored for a certain time are selected and cleaned, surface moisture is dried by cold air, the three kinds of apples are crushed separately by bar type pressers, and after being crushed, the three kinds of apples are mixed and pressed according to a mass ratio of the Rails apples to the Granny Smith apples to the Gala apples=70%:15%:15% to obtain apple clear juice and the peel residue; and according to a volume of mixed juice of the apple clear juice and the peel residue, 50 mg/L of potassium metabisulfite and 20 mg/L of VC are added in a crushing process, and meanwhile, carbon dioxide gas fills for protection according to a filling amount of 0.5 kg per kilolitre of the mixed juice.

(2) Performing peel residue heat treatment: the peel residue is subjected to the heat treatment for 1 h through controlling a temperature to be 75° C.

(3) Performing enzyme treatment on the peel residue: a certain amount of the clear juice (with the adding amount being 20% of the clear juice obtained in step (1)) is immediately added into the peel residue after the heat treatment for uniform mixing and cooling, 50 mg/L of an active complex enzyme I is added, the complex enzyme I is composed of the cellulase, the pectinase, the xylanase and the cutinase according to a mass ratio of 2:2:1:1, and temperature control treatment (namely enzymolysis) is performed at 50° C. for 2 h.

(4) Mixing peel residue and the original clear juice (mixed juice is prepared): the peel residue subjected to the enzyme treatment in step (3) and the clear juice obtained through pressing in step (1) are mixed to obtain the mixed juice, according to a volume of the mixed juice, 40 mg/L of a complex enzyme II composed of the pectinase for brewing and the β-glucosidase is added, and the complex enzyme II is composed of the pectinase and the β-glucosidase according to a mass ratio of 2:1.

(5) Adjusting a sugar degree: the sugar degree of the apple mixed juice is measured, wherein a ratio of cane sugar to fructose is 2:1, and sugar is added to adjust the sugar degree of the mixed juice to be 23% to reach a standard of brewing 12° dry wine.

(6) Performing early-stage fermentation: the *C. zemplinina* producing glycerol is taken to be activated, moderate non-*Saccharomyces cerevisiae* seeds are prepared, the non-*Saccharomyces cerevisiae* seeds are inoculated according to $1\times10^6$ CFU/mL per litre, dipping fermentation is performed for 7 d, a cooling device is adopted in a fermentation period to keep a fermentation liquor temperature to be 15° C., and cap pressing, temperature measuring, specific gravity measuring and recording are performed every day.

(7) Performing main fermentation: a prepared active dry yeast seed solution is inoculated into a fermentation system after the early-stage fermentation is finished, and a seed inoculation amount is 10% of an amount of non-*Saccharomyces cerevisiae* in the fermentation system at the moment. Management of a fermentation process is performed, a temperature is controlled to be 28° C., the cap pressing, the temperature measuring and the specific gravity measuring are performed every day, and fermentation is stopped when a specific gravity is reduced to 0.992.

(8) Separating wine and residue: centrifugal separation of the peel residue is performed repeatedly (5000 rpm) until separated raw wine is free of large suspended solids, and centrifugation may be stopped to obtain the raw wine.

(9) Starting malo-lactic fermentation (the malo-lactic fermentation is performed as needed): active lactic acid bacteria is activated and added to the raw wine according to $1\times10^6$ CFU/mL, a temperature is controlled to be 28-30° C. for the fermentation, the temperature measuring is performed every day, timing sampling is performed for malic acid filter paper chromatography, and the fermentation is stopped until no malic acid is detected through the chromatography.

(10) Performing fining treatment: according to a volume of the raw wine, 0.5 g/L of bentonite and 0.05 g/L of egg white powder are fully mixed with wine. In the meanwhile, 20 g/t of the potassium metabisulfite and the VC are separately added to inhibit bacterial contamination and prevent browning, sediments are formed 10 d after the fining treatment is performed, and the sediments are removed.

(11) Performing stabilizing treatment: fermentation cylinders are cooled after the fining treatment is performed and the sediments are removed, a temperature of the wine in the cylinders is kept to be −4.5° C., and the temperature is maintained for 14 d.

(12) Performing filtering: the wine is filtered through cross flow filtration, and sedimentary substances and microorganisms are removed.

In production, it is found that in the example, the peel residue is subjected to the heat treatment, part of the wax is dissolved, part of cuticle cutin is exposed, and hydrolysis of the cellulase on the peel cuticle components is improved, so that accessibilities and hydrolysis efficiency of the cellulase, the pectinase and the xylanase to the peel components are improved, a dissolution rate and hydrolysis of flavor precursor substances in the peels are greatly improved, the content of the free-state aroma components in the cider is greatly increased by combining the effect of the β-glucosidase, and then fruity aroma of the cider is obviously enhanced. Great increase of content of the tannin in wine obviously enhances wine heavy feeling and aftertaste feeling.

Comparative Example 4. Brewing of Muscat Grape Wine

In a Muscat grape wine brewing technology in the comparative example, without being subjected to the peel residue heat treatment, Muscat grape peel residue is directly subjected to the enzyme treatment, in an enzyme treatment system, the cutinase is not used, and a specific method is as follows:

(1) The ripe Muscat grapes are selected and sorted, and unripe grapes, decayed grapes and mildewed grapes are removed. The left grapes with peduncles removed are crushed, the potassium metabisulfite is added in a crushing process, according to a volume of mixed juice of the peel residue and grape clear juice, an adding amount of the potassium metabisulfite is 50 mg/L, and the peel residue and the grape clear juice are separated through pressing.

(2) Performing enzyme treatment on the peel residue: a certain amount of the grape clear juice (with the adding amount being 20% of the grape clear juice obtained in step (1)) is added into the peel residue, a temperature is increased to 50° C., 50 mg/L of an active complex enzyme is added, the complex enzyme is composed of the active cellulase, the active pectinase and the active xylanase according to a mass ratio of 2:2:1, and temperature control treatment (namely enzymolysis) is performed at 50° C. for 2 h.

(3) Mixing peel residue and the grape clear juice (mixed juice is prepared): the peel residue subjected to the enzyme treatment in step (2) and the grape clear juice in step (1) are mixed to obtain the mixed juice, according to a volume of the mixed juice, 40 mg/L of a complex enzyme II composed of the pectinase for brewing and the β-glucosidase is added, and the complex enzyme II is composed of the pectinase and the β-glucosidase according to a mass ratio of 2:1.

(4) Adjusting a sugar degree: the sugar degree of the mixed juice is measured, and sugar is added to adjust the sugar degree of the mixed juice to be 23% to reach a standard of brewing 12° dry grape wine.

(5) Performing early-stage fermentation: the non-*Saccharomyces cerevisiae* producing glycerol is taken to be activated, moderate non-*Saccharomyces cerevisiae* seeds are prepared, the non-*Saccharomyces cerevisiae* is inoculated according to $1\times10^6$ CFU/mL per litre, dipping fermentation is performed for 7 d, a cooling device is adopted in a fermentation period to keep a fermentation liquor temperature to be 15° C., and cap pressing, temperature measuring, specific gravity measuring and recording are performed every day.

(6) Performing main fermentation: a prepared active dry yeast seed solution is inoculated into a fermentation system after the early-stage fermentation is finished, and a seed inoculation amount is 10% of the amount of the non-*Saccharomyces cerevisiae* in the fermentation system at the moment. Management of a fermentation process is performed, a temperature is controlled to be 28° C., the cap pressing, the temperature measuring and the specific gravity measuring are performed every day, and fermentation is stopped when a specific gravity is reduced to 0.992.

(7) Separating wine and residue: centrifugal separation of the peel residue is performed repeatedly (5000 rpm) until separated raw wine is free of large suspended solids, and centrifugation may be stopped to obtain the raw wine.

(8) Starting malo-lactic fermentation: active lactic acid bacteria is activated and added to the raw wine according to $1\times10^6$ CFU/mL, a temperature is controlled to be to 28° C. for the fermentation, the temperature measuring is performed every day, timing sampling is performed for malic acid filter paper chromatography, and the fermentation is stopped until no malic acid is detected through the chromatography.

(9) Performing fining treatment: according to a volume of the raw wine, 0.5 g/L of bentonite and 0.05 g/L of egg white powder are fully mixed with wine. In the meanwhile, 20 g/t of the potassium metabisulfite is added, sediments are formed 10 d after the fining treatment is performed, and the sediments are removed.

(10) Performing stabilizing treatment: fermentation cylinders are cooled after the fining treatment is performed and the sediments are removed, a temperature of the wine in the cylinders is kept to be −4.5° C., and the temperature is maintained for 14 d.

(11) Performing filtering: the wine is filtered through cross flow filtration, and sedimentary substances and microorganisms are removed.

It is found that the wine after fermentation has appropriate aroma in production.

Comparative Example 5. Brewing of Muscat Grape Wine

In a Muscat grape wine brewing technology in the comparative example, without being subjected to the peel residue heat treatment, Muscat grape peel residue is directly subjected to the enzyme treatment, in an enzyme treatment system, the cutinase is used, and a specific method is as follows:

(1) The ripe Muscat grapes are selected and sorted, and unripe grapes, decayed grapes and mildewed grapes are removed. The left grapes with peduncles removed are crushed, the potassium metabisulfite is added in a crushing process, according to a volume of mixed juice of the peel residue and grape clear juice, an adding amount of the potassium metabisulfite is 50 mg/L, and the peel residue and the grape clear juice are separated through pressing.

(2) Performing enzyme treatment on the peel residue: a certain amount of the grape clear juice (with the adding amount being 20% of the grape clear juice obtained in step (1)) is added into the peel residue, a temperature is increased to 50° C., 50 mg/L of a complex enzyme I is added, the complex enzyme I is composed of the active cellulase, the active pectinase, the active xylanase and the active cutinase according to a mass ratio of 2:2:1:1, and temperature control treatment (namely enzymolysis) is performed at 50° C. for 2 h.

(3) Mixing peel residue and grape clear juice (mixed juice is performed): the peel residue subjected to the enzyme treatment in step (2) and the grape clear juice in step (1) are mixed to obtain the mixed juice, according to a volume of the mixed juice, 40 mg/L of a complex enzyme II composed of the pectinase for brewing and the β-glucosidase is added, and the complex enzyme II is composed of the pectinase and the β-glucosidase according to a mass ratio of 2:1.

(4) Adjusting a sugar degree: the sugar degree of the mixed juice is measured, and sugar is added to adjust the sugar degree of the mixed juice to be 23% to reach a standard of brewing 12° dry grape wine.

The other steps are the same as those of Comparative Example 4.

In production, it is found that in the comparative example, the cutinase is configured to perform the enzyme treatment on the peel residue, part of cuticles is degraded, degrees of hydrolysis of the cellulase, the pectinase and the xylanase on the corresponding components in the apple epidermis are improved, dissolution rates and the hydrolysis of the tannin and flavor precursor substances in the peels are improved, and the content of the free-state aroma components in the grape wine is increased by combining the effect of the β-glucosidase, so that variety aroma of the grape wine is enhanced. Increase of content of the tannin in wine enhances wine heavy feeling and aftertaste feeling.

Comparative Example 6. Brewing of Muscat Grape Wine

In a Muscat grape wine brewing technology in the example, grape peel residue is subjected to the peel residue heat treatment after the Muscat grapes are crushed and then is subjected to the enzyme treatment, but the cutinase is not used.

(1) The ripe Muscat grapes are selected and sorted, and unripe grapes, decayed grapes and mildewed grapes are removed. The left grapes with peduncles removed are crushed, the potassium metabisulfite is added in a crushing process, according to a volume of mixed juice of the peel residue and grape clear juice, an adding amount of the potassium metabisulfite is 50 mg/L, and the peel residue and the grape clear juice are separated through pressing.

(2) Performing peel residue heat treatment: the peel residue is subjected to the heat treatment for 1 h through controlling a temperature to be 75° C.

(3) Performing enzyme treatment on the peel residue: a certain amount of the original grape clear juice (with the adding amount being 20% of the grape clear juice obtained in step (1)) is immediately added into the peel residue after the heat treatment for uniform mixing and cooling, 50 mg/L of a complex enzyme is added, the complex enzyme is composed of the active cellulase, the active pectinase and the active xylanase according to a mass ratio of 2:2:1, and temperature control treatment (namely enzymolysis) is performed at 50° C. for 2 h.

(4) Mixing peel residue and grape clear juice (mixed juice is prepared): the peel residue subjected to the enzyme treatment in step (3) and the grape clear juice in step (1) are mixed to obtain the mixed juice, according to a volume of the mixed juice, 40 mg/L of a complex enzyme II composed of the pectinase for brewing and the β-glucosidase is added, and the complex enzyme II is composed of the pectinase and the β-glucosidase according to a mass ratio of 2:1.

(5) Adjusting a sugar degree: the sugar degree of the mixed juice is measured, and sugar is added to adjust the sugar degree of the mixed juice to be 23% to reach a standard of brewing 12° dry grape wine.

The other steps are the same as those of Comparative Example 4.

In production, it is found that in the comparative example, the peel residue is subjected to the heat treatment, part of the wax is dissolved, and efficiency of hydrolysis of the cellulase, the pectinase and the xylanase on the peel components is improved, so that a dissolution rate and the hydrolysis of flavor precursor substances in the peels are improved, the content of the free-state aroma components in the grape wine is increased by combining the effect of the β-glucosidase, and then variety aroma of the grape wine is enhanced. Increase of content of the tannin in wine enhances wine heavy feeling and aftertaste feeling.

Example 2 Brewing of Muscat Grape Wine

Figure 1:
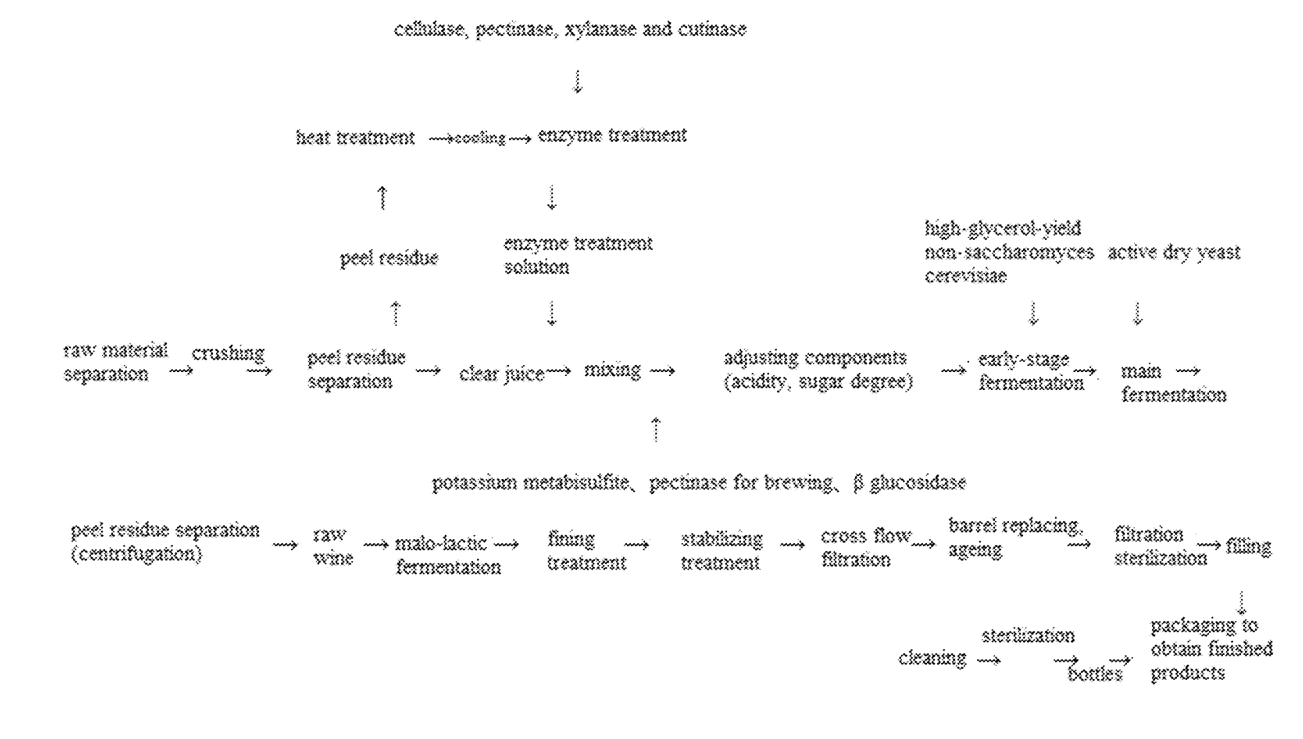
FIG. 1 is a production technology process of Muscat grape dry brewed wine.

In a Muscat grape wine brewing technology in the example, grape peel residue after the Muscat grapes are crushed is subjected to the heat treatment and then is directly subjected to the enzyme treatment, the cutinase is used in an enzyme treatment process, a technological process is as shown in FIG. 1, and a specific method is as follows:

(1) The ripe Muscat grapes are selected and sorted, and unripe grapes, decayed grapes and mildewed grapes are removed. The left grapes with peduncles removed are crushed, the potassium metabisulfite is added in a crushing process, according to a volume of mixed juice of the peel residue and grape clear juice, an adding amount of the potassium metabisulfite is 50 mg/L, and the peel residue and the grape clear juice are separated through pressing.

(2) Performing peel residue heat treatment: the peel residue is subjected to the heat treatment for 1 h through controlling a temperature to be 75° C.

(3) Performing enzyme treatment on the peel residue: a certain amount of the original grape clear juice (with the adding amount being 20% of the grape clear juice obtained in step (1)) is immediately added into the peel residue after the heat treatment for uniform mixing and cooling, 50 mg/L of a complex enzyme I is added, the complex enzyme I is composed of the active cellulase, the active pectinase, the active xylanase and the active cutinase according to a mass ratio of 2:2:1:1, and temperature control treatment (namely enzymolysis) is performed at 50° C. for 2 h.

(4) Mixing peel residue and grape clear juice (mixed juice is prepared): the peel residue subjected to the enzyme treatment in step (3) and the grape clear juice in step (1) are mixed to obtain the mixed juice, according to a volume of the mixed juice, 40 mg/L of a complex enzyme II composed of the pectinase for brewing and the β-glucosidase is added, and the complex enzyme II is composed of the pectinase and the β-glucosidase according to a mass ratio of 2:1.

(5) Adjusting a sugar degree: the sugar degree of the mixed juice is measured, and sugar is added to adjust the sugar degree of the mixed juice to be 23% to reach a standard of brewing 12° dry grape wine.

(6) Performing early-stage fermentation: the non-*Saccharomyces cerevisiae* producing glycerol is taken to be activated, moderate non-*Saccharomyces cerevisiae* seeds are prepared, the non-*Saccharomyces cerevisiae* is inoculated according to $1\times10^6$ CFU/mL per litre, dipping fermentation is performed for 7 d, a cooling device is adopted in a fermentation period to keep a fermentation liquor temperature to be 15° C., and cap pressing, temperature measuring, specific gravity measuring and recording are performed every day.

(7) Performing main fermentation: prepared active dry yeast seed solution is inoculated into a fermentation system after the early-stage fermentation is finished, and a seed inoculation amount is 10% of an amount of the non-*Saccharomyces cerevisiae* in the fermentation system at the moment. Management of a fermentation process is performed, a temperature is controlled to be 28° C., the cap pressing, the temperature measuring and the specific gravity measuring are performed every day, and fermentation is stopped when a specific gravity is reduced to 0.992.

(8) Separating wine and residue: centrifugal separation of the peel residue is performed repeatedly (5000 rpm) until separated raw wine is free of large suspended solids, and centrifugation may be stopped to obtain the raw wine.

(9) Starting malo-lactic fermentation: active lactic acid bacteria is activated and added to the raw wine according to $1\times10^6$ CFU/mL, a temperature is controlled to be to 28° C. for the fermentation, the temperature measuring is performed every day, timing sampling is performed for malic acid filter paper chromatography, and the fermentation is stopped until no malic acid is detected through the chromatography.

(10) Performing fining treatment: according to a volume of the raw wine, 0.5 g/L of bentonite and 0.05 g/L of egg white powder are fully mixed with wine. In the meanwhile, 20 g/t of the potassium metabisulfite is added, sediments are formed 10 d after the fining treatment is performed, and the sediments are removed.

(11) Performing stabilizing treatment: fermentation cylinders are cooled after the fining treatment is performed and the sediments are removed, a temperature of the wine in the cylinders is kept to be −4.5° C., and the temperature is maintained for 14 d.

(12) Performing filtering: the wine is filtered through cross flow filtration, and sedimentary substances and microorganisms are removed.

In production, it is found that in the example, the peel residue is subjected to the heat treatment, part of the wax is dissolved, part of the cuticle cutin is exposed, and hydrolysis of the cutinase on the peel cuticle components is improved, so that accessibilities and hydrolysis efficiency of the cellulase, the pectinase and the xylanase to the peel components are improved, a dissolution rate and hydrolysis of flavor precursor substances in the peels are greatly improved, the content of the free-state aroma components in the grape wine is greatly increased by combining the effect of the β-glucosidase, and then variety aroma of the grape wine is obviously enhanced. Great increase of content of the tannin in wine obviously enhances wine heavy feeling and aftertaste feeling.

Comparative Examples—Traditional Brewing Methods

A disclosure point of the present disclosure is that the peel residue is treated through the cutinase after being separated, and in order to compare outstanding effects of the technology, a traditional brewing method of cider and a traditional brewing method of Muscat grape wine are provided as the comparative examples to prove that cider and grape wine in the present disclosure have better flavor and color. As a result, it is indicated that the cider or the grape wine in the comparative examples are very different from the cider or the grape wine in the present disclosure in color and taste.

According to the comparative examples, by means of an existing technological method, the apples or the grapes are directly subjected to dipping fermentation after being crushed, peel residue separation, the peel residue heat treatment and the peel residue enzyme treatment are not performed, but the pectinase for brewing and the β-glucosidase are added during the dipping fermentation.

Comparative Example 7. Conventional Dipping Fermentation of Cider

Steps in a process of the example are substantially the same as steps of Example 1, but in step (1), the apples are not subjected to peel residue separation after being pressed; step (2) and step (3) are not executed, and step (4) is directly executed; juicing is performed by adopting the apples for common cider brewing (such as Fuji apples); meanwhile, the potassium metabisulfite and VC are added in a crushing process, and carbon dioxide is not adopted for protection; step (6) of early-stage fermentation is not executed, step (7) of fermentation of an active dry yeast is directly executed, a membrane filtration mode is adopted during wine and residue separation in step (8), and egg white powder is not added in fining treatment operation in step (10).

Comparative Example 8. Conventional Dipping Fermentation of Muscat Grape Wine

Steps in a process of the example are substantially the same as steps of Example 2, but in step (1), the Muscat grapes are not subjected to peel residue separation after being subjected to peduncle removing and crushing; step (2) and step (3) are not executed, and step (4) is directly executed; step (6) of early-stage fermentation is not executed, step (7) of fermentation of active dry yeast is directly executed, a membrane filtration mode is adopted during wine and residue separation in step (8), and egg white powder is not added in fining treatment operation in step (10).

TABLE 1

Sensory Evaluation Comparison of Cider

|  | Wine color | Sensory levels of wine aroma | Residual sugar (g/l) | Taste* |
|---|---|---|---|---|
| Comparative Example 1 | Clear and transparent | General aroma | 3.4 | 4.2 |
| Comparative Example 2 | Clear and transparent | Full aroma | 3.3 | 4.7 |
| Comparative Example 3 | Clear and transparent | Faint aroma | 3.2 | 4.5 |
| Example 1 | Clear and transparent | Full aroma | 3.5 | 5.0 |
| Comparative Example 7 | Clear and transparent | Unobvious aroma | 3.3 | 3.7 |

*An evaluation method of sensory levels of wine aroma and taste is as follows: scores are given after smelling, tasting, and scoring by 5 people according to a score range of 1-5.

TABLE 2

Sensory Evaluation Comparison of Muscat Grape Wine

|  | Wine color | Sensory levels of wine aroma | Residual sugar (g/l) | Taste* |
|---|---|---|---|---|
| Comparative Example 4 | Clear and transparent | General aroma | 3.7 | 4.2 |
| Comparative Example 5 | Clear and transparent | Full aroma | 3.4 | 4.6 |
| Comparative Example 6 | Clear and transparent | Faint aroma | 3.6 | 4.3 |
| Example 2 | Clear and transparent | Full aroma | 3.3 | 5.0 |
| Comparative Example 8 | Clear and transparent | Unobvious aroma | 3.4 | 4.0 |

*An evaluation method of sensory levels of wine aroma and taste is as follows: scores are given after smelling, tasting, and scoring by 5 people according to a score range of 1-5.

Content of aroma glycoside substances in the fruit epidermis is far higher than that in fruit juice, the content of the aroma glycoside substances in fresh fruit wine or the fruit juice is greatly increased through cutinase treatment in the disclosure, and content of the free-state aromatic substances in the grape wine is further greatly increased through the effect of the β-glucosidase, so that a purpose of grape wine aroma enhancement is achieved. Besides, terpene aroma substances are main characteristic flavor substances of Muscat grapes, variety aroma of the grape wine is more prominent due to the increase of variety and content of free-state terpene substances in the grape wine, the grape wine has more variety characteristics, and the purpose of aroma enhancement is achieved; meanwhile, a release amount of the tannin in the peels to the wine is increased through decomposition of the peels, and a heavy feeling and a aftertaste degree of the wine are enhanced; and in addition, according to a strategy in the present disclosure, the non-*Saccharomyces cerevisiae* and the *Saccharomyces cerevisiae* are adopted to perform sequential mixed bacteria dipping fermentation, complex aroma components are generated through early-stage fermentation of the high-glycerol-yield non-*Saccharomyces cerevisiae*, a large amount of glycerol is generated, and meanwhile, an acid-reducing effect is achieved, so that the mellow taste and flavor complexity of the wine are increased, and taste is obviously improved.

While the present disclosure has been disclosed above with the exemplary examples, the above examples are not intended to limit the present disclosure, and any person familiar with this technology can make various changes and modifications without departing from spirit and scope of the present disclosure, and therefore the scope of protection of the present disclosure should be defined by the claims.

What is claimed is:

1. A method of brewing fruit wine, comprising the following steps in the following order:
   (a) treating raw materials by:
   crushing grapes or apples to obtain a clear juice and a peel residue,
   adding potassium metabisulfite in a crushing process in an amount of 50 mg/L to 70 mg/L according to a volume of mixed juice of the clear juice and the peel residue;
   adding vitamin C and carbon dioxide in the crushing process when the raw materials are the apples, in an amount of 20 mg/L to 40 mg/L according to the volume of the mixed juice;
   (b) performing a heat treatment on the peel residue to melt wax from the peel residue by maintaining the peel residue at a temperature of 72° C. to 75° C. for 1 hour;
   (c) performing an enzyme treatment on the peel residue by;
   mixing 20% of the clear juice obtained in step (a) and the peel residue subjected to the heat treatment in step (b) to obtain mixed residue liquid,
   adding 20 mg/L to 50 mg/L of a complex enzyme I to the mixed residue liquid according to a volume of the mixed residue liquid, and
   performing enzymolysis at 45° C. to 55° C. for 2 hours,
   wherein the complex enzyme I comprises cellulase, pectinase, xylanase, and cutinase according to a mass ratio of (2-4):(2-4):(1-2):(1-2);
   (d) preparing mixed juice by;
   mixing the peel residue subjected to the enzyme treatment in step (c) and the clear juice obtained in step (a) to obtain the mixed juice, and
   adding 20 mg/L to 50 mg/L of a complex enzyme II according to a volume of the mixed juice,
   wherein the complex enzyme II comprises the pectinase and β-glucosidase, and a mass ratio of the pectinase to the β-glucosidase is (2-3):(1-2), and
   wherein, as a result of the enzyme treatment of step (c) and addition of the complex enzyme II, aroma glycosides released from the peel residue and aromatic substances are present in higher amounts in the fruit wine than if the peel residue was not subjected to the enzyme treatment of step (c) and addition of the complex enzyme II;
   (e) adjusting sugar content by:
   measuring the sugar content of the mixed juice subjected to the enzymolysis in step (d), and
   adding sugar to adjust the sugar content of the mixed juice according to a standard of brewing 12° apple dry wine;
   (f) performing an early-stage fermentation by:
   inoculating non-*Saccharomyces cerevisiae* for fermentation, in an amount of $10^6$ CFU/mL, at a fermentation temperature of 12° C. to 15° C. for 6 days to 8 days, wherein the non-*Saccharomyces cerevisiae* is *T. delbrueckii*, *L. theromotolerans*, or *C. zemplinina*;

(g) performing a main fermentation by:
  inoculating a yeast seed solution into a fermentation system after the early-stage fermentation of step (f) is finished,
  wherein a seed inoculation amount is 10% (mass fraction) of an amount of the non-*Saccharomyces cerevisiae* in the fermentation system,
  wherein the fermentation is performed at a temperature of 25° C. to 30° C., and
  wherein the fermentation is stopped when a specific gravity is reduced to 0.994 to 0.992, so as to obtain a fermentation liquor;

(h) separating wine and residue by centrifuging the fermentation liquor to obtain a supernatant;

(i) performing a fining treatment by:
  mixing the supernatent with 0.3 g/L to 0.5 g/L of bentonite, 0.04 g/L to 0.06 g/L of egg white powder, and 18 mg/L to 20 mg/L of potassium metabisulfite according to a volume of the raw wine, and
  performing the fining treatment for 8 days to 10 days;

(j) performing a stabilizing treatment by:
  removing sediments after the fining treatment to obtain wine, and
  maintaining the wine at a temperature of −4° C. to −4.5° C. for 10 days to 14 days; and (k) performing filtering by filtering the wine to thereby obtain a fruit wine finished product.

2. The method of brewing fruit wine according to claim 1, wherein in the step (a), according to the volume of the mixed juice, the addition amount of the vitamin C is 20 mg/L, and the amount of the carbon dioxide is 0.5 kg/kL.

3. The method of brewing fruit wine according to claim 1, wherein in the step (c), according to the volume of the mixed residue liquid, the addition amount of the complex enzyme I is 50 mg/L, and the complex enzyme I is composed of the cellulase, the pectinase, the xylanase and the cutinase according to the mass ratio of 2:2:1:1.

4. The method of brewing fruit wine according to claim 1, wherein in the step (d), according to the volume of the mixed juice, 40 mg/L of the complex enzyme II is added, the complex enzyme II is composed of the pectinase and the β-glucosidase, and the mass ratio of the pectinase to the β-glucosidase is 2:1.

5. The method of brewing fruit wine according to claim 1, wherein in step (e), the sugar degree of the mixed juice is 23%, and a mass ratio of cane sugar to fructose is 2:1.

6. The method of brewing fruit wine according to claim 1, wherein in step (f), the non-*Saccharomyces cerevisiae* is *C. zemplinina*.

7. The method of brewing fruit wine according to claim 1, wherein in step (g), the dry yeast is an Angel grape wine active dry yeast RV002.

8. The method of brewing fruit wine according to claim 1, wherein in step (h), after the wine and the residue are separated, according to product types, raw wine of dry red grape wine is subjected to malo-lactic fermentation, in which according to the volume of the raw wine, $10^6$ CFU/mL of lactic acid bacteria are inoculated into the raw wine, the fermentation is performed at a temperature of 28° C. to 30° C., and the fermentation is finished until no malic acid is detected.

* * * * *